United States Patent [19]

Sangster

[11] 3,764,824

[45] Oct. 9, 1973

[54] SHIFT REGISTER

[75] Inventor: Frederick Leonard Johan Sangster, Emmasingel, Eindhoven, Netherlands

[73] Assignee: U.S. Philips Corporation, New York, N.Y.

[22] Filed: Sept. 11, 1972

[21] Appl. No.: 288,104

[30] Foreign Application Priority Data

Sept. 16, 1971 Netherlands ....................... 7112720

[52] U.S. Cl. ............................. 307/221 C, 307/251

[51] Int. Cl. ............................................ G11c 11/40

[58] Field of Search ................ 307/221 C, 225, 251, 307/279, 304, 221 R

[56] References Cited

UNITED STATES PATENTS

| | | | |
|---|---|---|---|
| 3,609,392 | 9/1971 | Tetik | 307/221 C |
| 3,621,279 | 11/1971 | Jen | 307/251 |
| 3,621,283 | 11/1971 | Teer | 307/304 |
| 3,666,972 | 5/1972 | Sangster | 307/221 C |
| 3,599,010 | 8/1971 | Crawford | 307/251 |
| 3,676,711 | 7/1972 | Ahrons | 307/221 C |

*Primary Examiner*—John W. Huckert
*Assistant Examiner*—R. E. Hart
*Attorney*—Frank R. Trifari

[57] ABSTRACT

The invention relates to a shift register which has a first and a second delay circuit. The analogue signal to be delayed is applied to the first delay circuit, and the delayed signal is taken from the second delay circuit. Parallel auxiliary delay circuits are connected between the said two delay circuits. The shift rate of the auxiliary delay circuit is lower than the shift rate of the first and second delay circuits.

9 Claims, 3 Drawing Figures

SHIFT REGISTER

Figure 1:
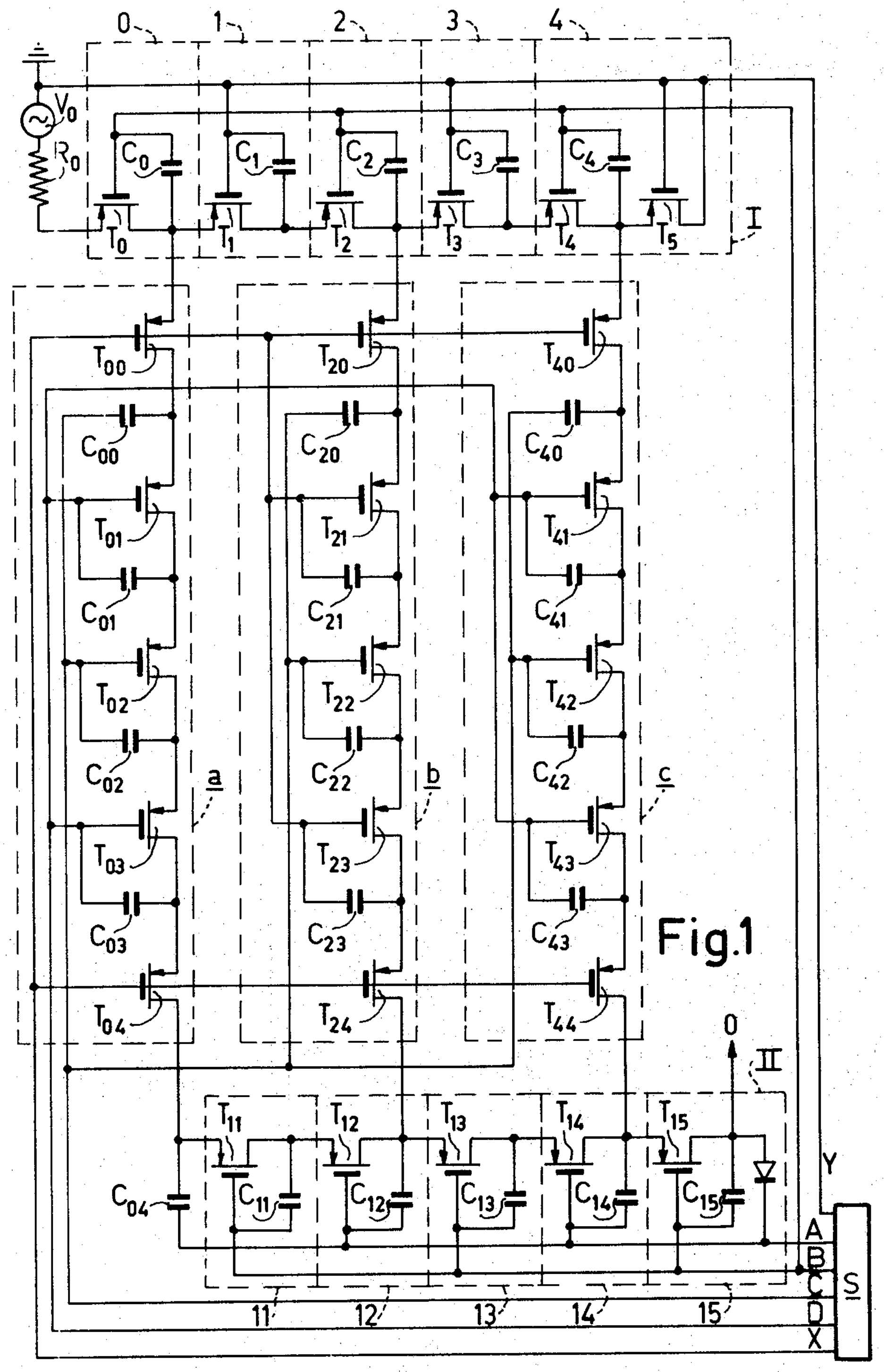

The invention relates to a shift register which comprises at least a first and a second delay circuit which each comprise a row of storage elements which each have at least a capacitance and a control electrode, means being provided to apply clock pulses to the control electrodes of the first and second delay circuits. Netherlands Pat. application No. 6,711,463 (PHN. 2,657) describes a shift register of the said type in which a first, a second and a third delay circuit are connected in parallel and which is suitable for handling, for example, analogue signals. The signal inputs of these delay circuits are jointly connected to a clock pulse source and their outputs are connected via diodes to a common point from which the delayed output signal may be derived. The control electrodes of the storage elements of each of the delay circuits are divided in three groups. Each group is connected jointly which one other group from each of the other two delay circuits, to a clock pulse source. The three clock pulse sources deliver clock pulses such that the information is applied to the three delay circuits in cyclic alternation, and the output signal also originates from each of the delay circuits in cyclic alternation. As a result of the parallel connection of the three delay circuits the transit time delay per storage element is greater than that obtained with the use of one delay circuit of the said type as a shift register. When the pulse repetition period of the clock pulses for the latter shift register is equal to T seconds, the delay time per storage element is equal to one-half T seconds. The entire delay time then will be equal to one-half Tm seconds, where $m$ is the number of storage elements of the said shift register. In the afore-described shift register having three congruent parallel delay circuits the transit time delay per storage element is two-thirds T seconds. The overall transit time delay will be equal to two-thirds Tm seconds, where $m$ is the number of storage elements in each of the delay circuits. This means that, if in both cases the same overall transit time delay is required, the number $m$ of storage elements of a delay circuit in the shift register having three parallel delay circuits is smaller than the number $m$ of storage elements required in the other shift register by a factor of three-fourths. This provides the advantage that there is less trouble due to charge losses which occur in transferring the charge from one storage capacitance to an other storage capacitance. In the aforementioned shift register three delay circuits are connected in parallel. As an alternative, however, $p$ delay circuits may be connected in parallel and $p$ clock pulse sources may be used. The delay time per storage element then is $(p - 1/p)$ T seconds. Depending upon the desired bandwidth and the overall delay time required there will be a value for $p$ at which the total number of storage elements required is a minimum.

The use of a large number of parallel delay circuits in the aforementioned shift register may give rise to difficulty. If, for example, 30 delay circuits are connected in parallel, 30 clock pulse sources are required. This means that 30 clock pulse conductors and 30 terminals for connection to the clock pulse sources are required. This is troublesome, particularly if such a shift register is to be made in integrated circuit form. The 30 clock pulse conductors together occupy a large area on a chip and also the 30 connecting points may readily give rise to capacitive cross talk to the output of the shift register. Hence steps have to be taken to prevent this capacitive cross talk, and this is difficult with so large a number of connections. In addition, the problem arose that with the use of a large number of parallel circuits interference signals (switching noise) are present in the output signal in the known shift register. These interference signals fall within the Nyquist bandwidth and cannot be removed by filtering. This is due to the fact that the information present in all the delay circuits never is simultaneously shifted one place. First the information in the first delay circuit is shifted one place, then the information in the second delay circuit is shifted one place, and so on. This shifting of information consequently requires a separate clock pulse for each of the parallel circuits. If now the amplitudes of these clock pulses are not exactly equal, interference signals will occur in the output signal, because the reference level which is directly proportional to the amplitude of the relevant pulse will be different from pulse to pulse. To obviate this type of distortion steps will have to be taken to make the amplitudes of the clock pulses equal within very narrow limits. Obviously this will be more difficult in proportion as the number of parallel circuits is larger. Moreover it has been found that when the slopes of the various pulses differ, this also may give rise to interference signals (switching noise).

It is an object of the present invention to remove the said difficulties, and a shift register according to the invention is characterized in that at least part of the storage elements of the first delay circuit are each connected via an auxiliary delay circuit to a storage element of the second delay circuit, the auxiliary delay circuits each comprising a row of storage elements which each have at least a capacitance and a control electrode, means being provided for applying to the control electrodes of these storage elements clock pulses such that the shift rate of the auxiliary delay circuits is lower than the shift rate of the first and second delay circuits.

Figure 2:
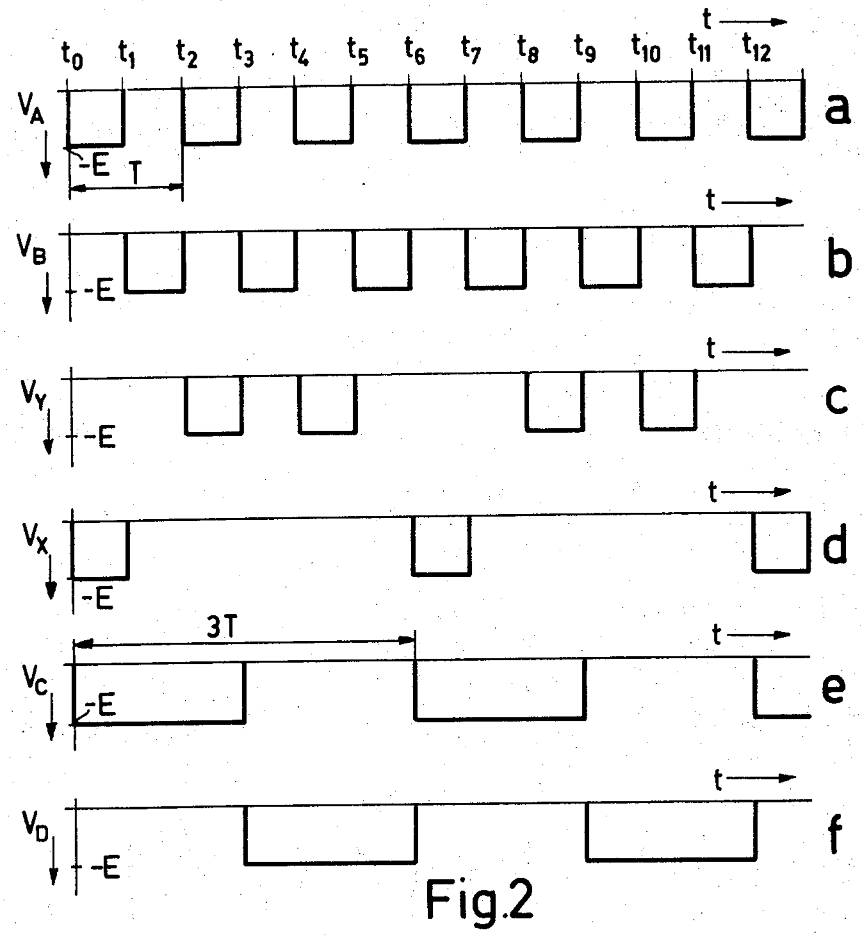
Figure 3:
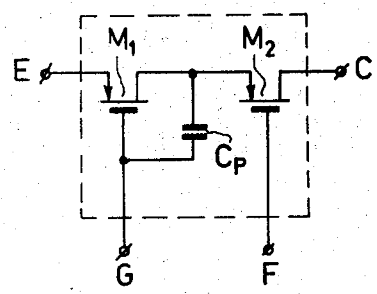

An embodiment of the invention will now be described, by way of example, with reference to the accompanying diagrammatic drawings, in which:

FIG. 1 is a circuit diagram of an embodiment of a shift register according to the invention, FIG. 2 shows voltage waveforms illustrating the operation of the shift register shown in FIG. 1, and FIG. 3 is an equivalent circuit diagram of a storage element which may be used in the shift register shown in FIG. 1.

Referring now to FIG. 1, a shift register comprises a first delay circuit I, a second delay circuit II and auxiliary delay circuits $a$, $b$ and $c$. Storage elements 0, 1, 2, 3 and 4 of the first delay circuit each comprise a capacitor and a field effect transistor. The capacitor of each storage element is connected between the drain and gate electrodes of the associated transistor. The gates of the transistors are the control electrodes of the storage elements. The main current paths of the transistors $T_i$ ($i = 0, \ldots, 5$) are connected in series. The source electrode of the transistor $T_0$ is connected via the series connection of a resistor $R_0$ and a signal voltage source $V_0$ to a clock pulse conductor Y. The drain of the transistor $T_4$ is connected via the main current path of the field effect transistor $T_5$ to the clock pulse conductor Y, to which is also connected the gate of the latter transistor. The gates of the transistors $T_1$, $T_3$ and $T_5$ are connected to a clock pulse conductor Y. The gates of the $T_O$, $T_2$ and $T_4$ are connected to a clock pulse conductor B. Storage elements 11, 12, 13, 14 and 15 of the second delay circuit II each comprise a capacitor and a field effect transistor. The capacitors of the 0, . . . , storage elements are connected between the drain and gate electrodes of the associated transistors. The gates of the transistors are the control electrodes of the storage elements. The main current path of the transistors $T_i$ ($i = 11, \ldots 15$) are connected in series. The source of the transistor $T_{11}$ is connected via a capacitor $C_{O4}$ to a clock pulse conductor A. The delayed output signal may be derived from the drain O of the transistor $T_{15}$. The gates of the transistors $T_{11}$, $T_{13}$ and $T_{15}$ are connected to the clock pulse conductor B, and the gates of the transistors $T_{12}$ and $T_{14}$ are connected to the clock pulse conductor A. The auxiliary delay circuit *a* comprises transistors $T_{OY}$ ($Y = 0, \ldots 4$) the main current paths of which are connected in series. Between the drain and the gate of the transistor $T_{OY}$($Y = 1, \ldots 3$) is connected a capacitor $C_{OY}$($Y = 1, \ldots 3$) having the same subscript. The source of the transistor $T_{01}$ is connected via the capacitor $C_{OO}$ to a clock pulse conductor C and also via the main current path of the transistor $T_{OO}$ to the drain of the transistor $T_O$. The drain of the transistor $T_{03}$ is connected via the main current path of the transistor $T_{04}$ to the source of the transistor $T_{11}$. The auxiliary circuit *b* comprises transistors $T_{2Y}$ ($Y = 0, \ldots 4$) the main current paths of which are connected in series. Between the drain and the gate of the transistor $T_{2Y}$ ($Y = 1, \ldots 3$) there is connected a capacitor $C_{2Y}$ ($Y = 1, \ldots 3$) bearing the same subscript. The source of the transistor $T_{21}$ is connected via the capacitor $C_{20}$ to the clock pulse conductor C and also via the main current path of the transistor $T_{20}$ to the drain of the transistor $T_2$. The drain of the transistor $T_{23}$ is connected via the main current path of the transistor $T_{24}$ to the source of the transistor $T_{13}$. The auxiliary delay circuit *c* comprises transistor $T_{4Y}$($Y = 0, \ldots 4$) the main current paths of which are connected in series. Between the drain and the gate of the transistor $T_{4Y}$ ($Y = 1, \ldots 3$) there is connected a capacitor $C_{4Y}$ ($Y = 1, \ldots 3$) bearing the same subscript. The source of the transistor $T_{41}$ is connected via the capacitor $C_{40}$ to the clock pulse conductor C and also via the main current path of the transistor $T_{40}$ to the drain of the transistor $T_4$. The drain of the transistor $T_{43}$ is connected via the main current path of the transistor $T_{44}$ to the source of the transistor $T_{15}$. The gates of the transistors $T_{x0}$($x$ 1 0, 2, 4) and $T_{x4}$ ($x = 0, 2, 4$) are connected to a clock pulse conductor X. The gates of the transistors $T_{xy}$ ($x = 0,2,4$; $y$ *T32* 1,3) are connected to a clock pulse conductor D, and the gates of the transistors $T_{x2}$ ($x = 0,2,4$) are connected to the clock pulse conductor C. The clock pulse conductors A, B, C, D, X and Y are connected to a clock pulse source S which delivers clock pulses as shown in FIG. 2. The operation of the shift register shown in FIG. 1 is as follows.

During the time interval ($t_o - t_1$), see FIG. 2*d*, the amplitude of the clock pulse $V_X$ on the clock pulse conductor is equal to −E volts. As a result, the transistors $T_{00}$, $T_{20}$ and $T_{40}$ will be conducting, so that charge transfer will take place between the capacitors $C_0$ and $C_{00}$, $C_2$ and $C_{20}$, $C_4$ and $C_{40}$. In this interval the transistors $T_{04}$, $T_{24}$ and $T_{44}$ also are conducting, so that charge transfer will take place between the capacitors $C_{03}$ and $C_{04}C_{24}$ and $C_{12}$, $C_{43}$ and $C_{14}$. In other words, in the said interval the information present in the capacitors $C_0$, $C_2$ and $C_4$ of the first delay circuit I in the form of a lack of charge is transferred to the first storage capacitors $C_{00}$, $C_{20}$ and $C_{40}$ of the auxiliary delay circuits *a*, *b* and *c* respectively. Also, in this interval the information present in the capacitors $C_{03}$, $C_{23}$ and $C_{43}$ of the auxiliary delay circuits *a*, *b* and *c* respectively in the form of a lack of charge is transferred to the capacitors $C_{04}$, $C_{12}$ and $C_{14}$ of the second delay circuit II. At the end of the said interval the charge in each of the capacitors of the first delay circuit will be equal to $(E - V_d)$ C coulombs, which is the reference level. In this expression $V_d$ is the threshold voltage of the field effect transistors used and C is the capacitance value of the capacitors used.

During the interval ($t_1 - t_6$) new information is supplied to the first delay circuit I and also the information present in the delay circuit II is shifted to the output 0 of the shift register. During the same time interval the information present in the auxiliary delay circuits *a*, *b* and *c* is shifted once. FIGS. 2*a* and 2*b* show that the repetition frequency of the clock pulses for the first and second delay circuits is equal to T seconds. FIGS. 2*c* and 2*d* show that the repetition frequency of the clock pulses for the auxiliary delay circuits is equal to 3T seconds. This means that the shift rate of the auxiliary delay circuit is lower than that of the first and second delay circuits. In the shift register shown in FIG. 1 the shift rate of the auxiliary delay circuits is smaller than that of the first and second delay circuits by a factor of 3, which is the number of auxiliary delay circuits. In the time interval ($t_1 - t_2$) the voltage $V_B$ on the clock pulse conductor B is equal to −E volts, see FIG. 2*b*. As a result the transistor $T_O$ will become conducting, so that the charge present in the capacitor $C_O$ is reduced by an amount C. $\Delta V_1$, where $\Delta V_1$ is proportional to the amplitude of the input signal $V_i$. The transistors $T_i$ ($i = 1, \ldots 5$) are non-conducting during the same interval. In this interval the transistors $T_{11}$, $T_{13}$ and $T_{15}$ also are conducting, so that the charge deficiencies present in the capacitors $C_{04}$, $C_{12}$ and $C_{14}$ are replenished, until the charges in these capacitors have become equal to the reference charge of C $(E - V_d)$ coulombs. As a result the charge deficiencies present in the capacitors $C_{04}$, $C_{12}$ and $C_{14}$ have been transferred to the capacitors $C_{11}$, $C_{13}$ and $C_{15}$, respectively.

During the time inverval ($t_2 - t_3$) the voltages on the clock pulse conductors A and Y are equal to −E volts (see FIGS. 2*a* and 2*c*). As a result, in the first delay circuit the transistor $T_1$ will be conducting, so that the charge deficiency C. $\Delta V_1$ present in the capacitor $C_O$ is transferred to the capacitor $C_1$. In the second delay circuit II the transistors $T_{12}$ and $T_{14}$ are conducting, so that the charge deficiency present in the capacitor $C_{11}$ is transferred to the capacitor $C_{12}$ and the charge deficiency present in the capacitor $C_{13}$ is transferred to the capacitor $C_{14}$.

During the time interval ($t_3 - t_4$) the voltage on the clock pulse conductors D and B is equal to −E volts(see FIGS. 2*b* and 2*f*). As a result, the transistors $T_0$ and $T_2$ in the first delay circuit I will be conducting. Consequently the reference charge present in the capacitor $C_0$ will be reduced by an amount of C. $\Delta V_2$, where $\Delta V_2$ is proportional to the amplitude of the input signal $V_i$ in the time interval under consideration. Owing to the conductive condition of the transistor $T_2$ the charge deficiency C. $\Delta V_1$ present in the capacitor $C_1$ will be transferred to the capacitor $C_2$. In the second delay circuit II the transistors $T_{13}$ and $T_{15}$ are conducting, so that the charge deficiencies present in the capacitors $C_{13}$ and $C_{14}$ will be transferred to the capacitor $C_{15}$. During the same interval the transistors $T_{01}$, $T_{03}$, $T_{21}$, $T_{23}$, $T_{41}$ and $T_{43}$ of the auxiliary delay circuits are conducting. The capacitors connected to the source electrodes of the said transistors will be charged to the reference charge, whilst the capacitors connected to the drains of these transistors take over the charge deficiencies from the respective preceding capacitors. Thus, the reference charge is again present in the capacitors $C_{00}$, $C_{20}$ and $C_{40}$, so that these capacitors are capable again of receiving new information from the first delay circuit I. At the same time, information in the form of a charge deficiency is present in each of the capacitors $C_{03}$, $C_{23}$ and $C_{43}$.

During the time interval $(t_4 - t_5)$ the voltage on the clock pulse conductors A and Y is equal to −E volts, see FIGS. 2*a* and 2*c*. As a result, the transistors $T_1$ and $T_3$ in the first delay circuit I will be conducting. The charge deficiency C. $\Delta V_1$ present in the capacitor $C_2$ will be transferred to the capacitor $C_3$, and the charge deficiency present in the capacitor $C_0$ will be transferred to the capacitor $C_1$. In the second delay circuit II the transistor $T_{14}$ will be conducting, so that the charge deficiency present in the capacitor $C_{13}$ will be transferred to the capacitor $C_{14}$.

During the time interval $(t_5 - t_6)$ the voltage on the clock pulse conductor B is equal to −E volts, see FIG. 2*b*. As a result, the transistors $T_0$, $T_2$ and $T_4$ in the first delay circuit I are conducting. Consequently, the reference charge present in the capacitor $C_0$ will be reduced by an amount of C. $\Delta V_3$, where $\Delta V_3$ is proportional to the amplitude of the input signal $V_i$ in the time interval under consideration. Also, in the time interval under consideration the charge deficiency C. $\Delta V_2$ in the capacitor $C_1$ is transferred to the capacitor $C_2$, and the charge deficiency C. $\Delta V_1$ present in the capacitor $C_3$ is transferred to the capacitor $C_4$. In the delay circuit II the transistor $T_{15}$ alone is conducting, so that the charge deficiency present in the capacitor $C_{14}$ is transferred to the capacitor Y15. B the end of the interval under consideration the capacitors $C_{04}$, $C_{11}$, $C_{12}$, $C_{13}$ and $C_{14}$ all contain the reference charge, so that the second delay circuit is capable again of receiving information from the auxiliary delay circuits.

During the time interval $(t_6 - t_7)$ the voltage on the clock pulse conductor X is equal to −E volts, see FIG. 2*d*. As a result, the first and last transistor of each of the auxiliary circuits will be conducting, so that the information present in the first delay circuit I (C. $\Delta V_1$, C. $\Delta V_2$, C. $\Delta V_3$) is transferred to the said auxiliary delay circuits, and also the information present in the last storage element of each of the auxiliary delay circuits is transferred to the second delay circuit II.

From the above description of the operation of the shift register shown in FIG. 1 it will be clear that after information has been written into the first delay circuit I and the information present in the second delay circuit II has been read out, all the information present in the first delay circuit is simultaneously transferred to the auxiliary delay circuits by means of a single pulse $V_x$, whilst the information present in the last storage elements is simultaneously transferred to the second delay circuit by means of the same pulse. This means that the reference level for all information is the same and is determined by the amplitude of this one pulse $V_x$. When this amplitude differs from the amplitudes of the pulses $V_Y$, $V_B$ and $V_A$, no additional distortion will be produced.

In the embodiment of the shift register according to the invention shown in FIG. 1 three auxiliary delay circuits and six clock pulse conductors are used. Obviously, lengthening a first and second delay circuit enables more auxiliary delay circuits to be used with the same number of clock pulse conductors. The number of clock pulse conductors is independent of the number of auxiliary delay circuits used.

In the embodiment of the shift register shown in FIG. 1 storage elements are used which each comprise a field effect transistor and a capacitor connected between the drain and gate of this transistor. As an alternative, however, storage elements of the type shown in FIG. 3 may be used. Such a storage element comprises two transistors $M_1$ and $M_2$ and a storage capacitor connected between the drain and gate of the transistor $M_1$. The gate G of the transistor $M_1$ also serves as the control electrode of the storage element. When building a delay circuit from these storage elements the output C of one element is connected to the input E of the next element etc. The gates F of the storage elements may be connected, for example, to a point of constant potential. Alternatively the gate F of each storage element may be connected, for example, to a point of constant potential. Alternatively the gate F of each storage element may be connected to the control electrode G of the respective storage element, in which case different channel oxides are used for the transistors $M_1$ and $M_2$. Also, the gate electrode F may be connected to the control electrode via a direct-voltage source.

What is claimed is:

1. Shift register comprising a first and a second delay circuit which each comprise a row of storage elements which each have at least a capacitor and a control electrode, means being provided for supplying clock pulses to the control electrodes of the first and second delay circuits, characterized in that at least a member of storage elements of the first delay circuit are each connected through an auxiliary delay circuit to a storage element of the second delay circuit, the auxiliary delay circuit each comprising a row of storage elements which each have at least a capacitor and a control electrode, means being provided for applying to the control electrodes of these storage elements clock pulses such that the shift rate of the auxiliary delay circuit is lower than the shift rate of the first and second delay circuits.

2. Shift register as claimed in claim 1, characterized that the shift rates of the first and second delay circuits are equal, whilst the shift rate for the auxiliary delay circuit is smaller than the shift rate of the first and second delay circuits by a factor equal to the number of auxiliary delay circuits.

3. Shift register as claimed in claim 1, characterized in that each of the storage elements of the auxiliary delay circuits comprises at least one transistor having an input electrode, a control electrode and an output electrode, the control electrodes of the transistors of each first and each last storage element of the auxiliary delay circuits being jointly connected to a first clock pulse conductor, whilst the capacitors of the first and last storage elements of the auxiliary delay circuits each are connected between the output electrode of the associated transistor and a second clock pulse conductor, the capacitors of the remaining storage elements of the auxiliary delay circuits each being connected between the output electrode and the control electrode of the associated transistor, whilst the control electrodes of the transistors of the remaining storage elements of each of the auxiliary delay circuits are divided in two groups, one group being connected to the second clock pulse conductor and the second group being connected to a third clock pulse conductor.

4. Shift register as claimed in claim 3, characterized in that the transistors are bipolar transistors, the input electrode being the emitter, the control electrode being the base and the output electrode being the collector.

5. Shift register as claimed in claim 3, characterized in that the transistors are insulated-gate field effect transistors, the input electrode being constituted by the source electrode, the output electrode by the drain electrode and the control electrode by the gate electrode of the transistor.

6. Shift register as claimed in claim 3, characterized in that each storage element comprises a first and a second field effect transistor and a capacitor, the capacitor being connected between the drain and the gate of the first transistor, whilst the gate of the first transistor is the control electrode of the storage element and the drain of the first transistor is connected to the output of the storage element via the main current path of the second transistor.

7. Shift register as claimed in claim 6, characterized in that the gates of the second transistors of the storage elements are connected to points of constant potential.

8. Shift register as claimed in claim 6, characterized in that the gates of the second transistors of the storage elements are connected to the control electrodes of the respective storage elements.

9. Shift register as claimed in claim 1, characterized in that at least part of it is made in integrated circuit form in a semiconductor body.

* * * * *